Figure 1:
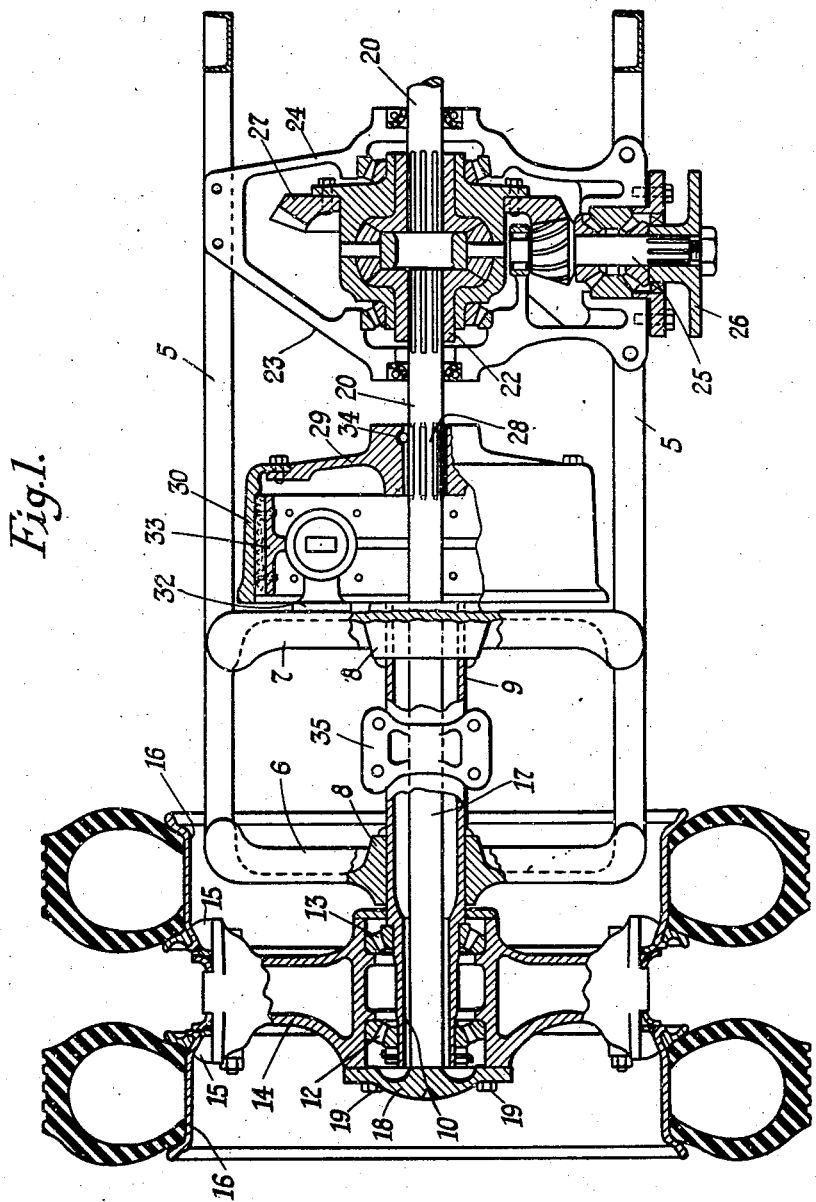

Oct. 29, 1946.  G. SPATTA  2,410,133
AXLE
Filed June 19, 1944  2 Sheets-Sheet 1

INVENTOR.
George Spatta
BY Walter E. Schirmer
ATTY.

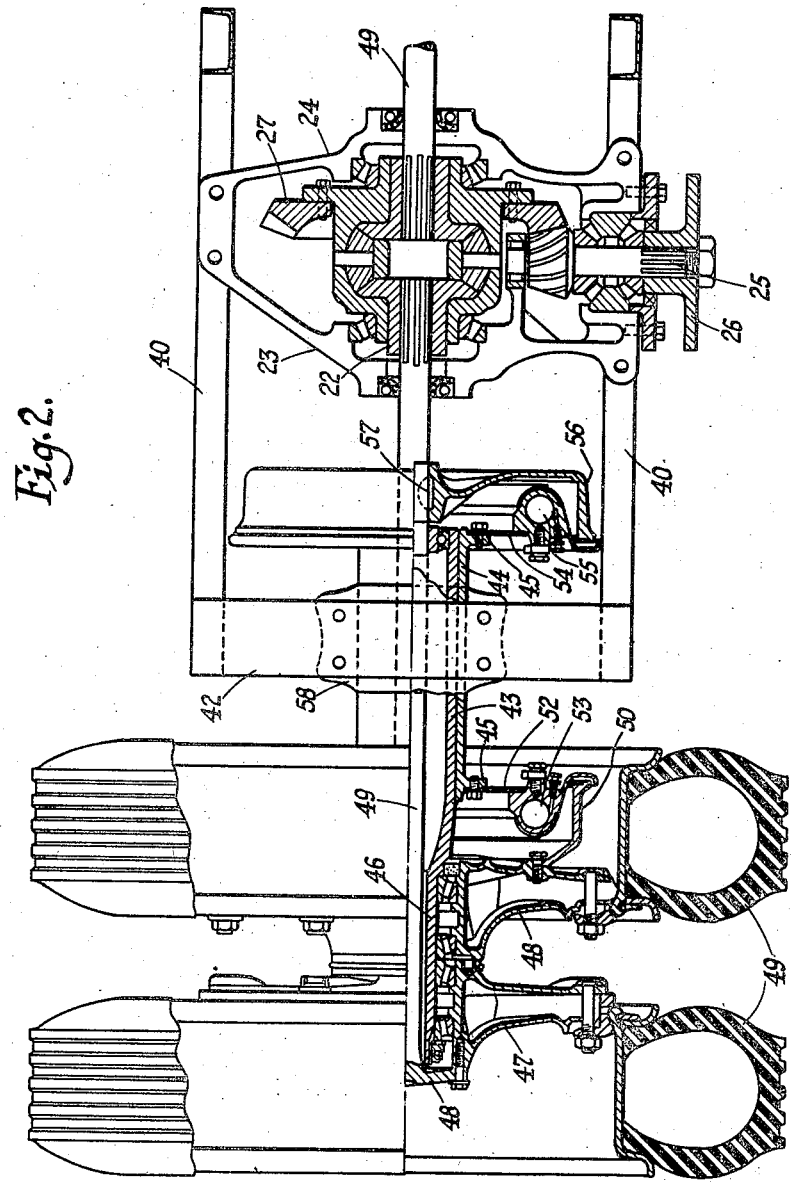

Patented Oct. 29, 1946

2,410,133

UNITED STATES PATENT OFFICE 2,410,133

AXLE

George Spatta, Buchanan, Mich., assignor to Clark Equipment Company, Buchanan, Mich., a corporation of Michigan Application June 19, 1944, Serial No. 540,921

4 Claims. (Cl. 180—75)

This invention relates to axles, and more particularly is concerned with a driving axle construction for heavy trucks, buses and similar types of motor vehicles.

It has been found that in the operation of these vehicles one of the major problems encountered is that of providing adequate braking surface to decelerate the vehicle when driving at high speeds and under heavy loads.

In the conventional type of driving axle construction utilizing dual wheels at the ends of the axle, the brake mechanism has been carried on a backing plate secured to the axle housing and the brake drum has been bolted directly to the wheel and disposed radially within the overhanging rim of the inboard wheel. It has been found under such conditions that extremely high temperatures are developed during application of the brakes, this braking being such as to at times produce vulcanizing of the tire bead to the rim and greatly accelerating the deterioration of the rubber due to the extreme heat. Heretofore, it has been impossible to overcome this problem with any degree of success due to the fact that the brake drum has had to be mounted on the wheel spider and thus is disposed within a location where it cannot be readily cooled, resulting in the development of extremely high temperatures mentioned.

The present invention contemplates developing an axle wherein the brake will be located at a point spaced from the end of the axle, and consequently spaced from the wheels so that there will be no danger of vulcanizing the tire to the rims. In addition, the brake drum and the braking apparatus is disposed in a location where it is readily contacted by the air moving beneath the vehicle, and can therefore be rapidly cooled and maintained cool because of the open location of the drum in the air currents.

The present construction also lends itself readily to a driving axle arrangement of a type in which the use of an axle housing itself is eliminated, the support for the axle being provided by a rigid rectangular type of frame of simplified construction to the ends of which is connected a spindle receiving the drive shaft and carrying suitable bearings for the wheel assemblies.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a top plan view, partly in section, showing one form of axle construction; and Figure 2 is a corresponding view of a modified form of construction.

Referring now in detail to Figure 1, there is provided an axle consisting of parallel transversely extending frame members 5 which may be in the form of channels, tubes or the like, which are joined at their ends by laterally spaced transverse webs 6 and 7 welded or otherwise secured to the cross members 5 to provide a rigid rectangular type of structure.

Received in the enlarged hub portions 8 of the webs 6 and 7 is a tubular spindle member 9 which member has its end reduced as at 10 to receive the bearing assemblies 12 and 13 upon which the wheel spider 14 is rotatably mounted. The wheel spider 14 is of the malleable cast type having hollow radially extending spokes provided at the spoke ends with suitable lug means 15. Mounted on these lug means are the tire rims 16 supporting the pneumatic tires.

Extending through the spider 10 is a drive shaft 17 which at its end is flanged as indicated at 18, and is bolted as by the studs 19 to the hub portion of the wheel spider 14 whereby torque applied to the shaft 17 will rotate the wheels about the bearings 12 and 13 for driving the vehicle.

The shaft 17 extends through the spider 9 and is then extended as indicated at 20 into the side gear 22 of a differential assembly indicated generally at 23. The differential 23 consists of a housing 24 supported on the two cross members 5 and having the driving pinion shaft 25 extending thereinto from the propeller shaft of the vehicle, being coupled to such shaft through the companion flange 26. The pinion shaft is adapted to drive the ring gear 27 which in turn drives the differential case into which the axle shaft portions 20 are extended.

Intermediate the inboard web 7 and the differential 23 the shaft portion 20 is splined as indicated at 28 to receive the hub portion 29 of a brake drum 30. It will be noted that this brake drum is of considerable axial extent and can be made as wide as the space between the web 7 and the side of the differential carrier 23. Mounted on the adjacent face of the web 7 is brake supporting means 32 carrying suitable actuating mechanism and the brake shoe 33. The hub 29 of the drum is preferably keyed on the splines 28 as by means of the lock pin 34. It will be apparent therefore that the drive shaft 17 which drives the wheels 16 is provided with a brake drum which is removed an appreciable distance from the wheels and is disposed out in the open beneath the vehicle where it is subjected to all of the air currents beneath the vehicle. Furthermore, the brake drum can be made of ample size to accommodate all the braking effort required and still be maintained where any heat generated will not have an adverse effect upon the rubber tire.

Intermediate the two webs 6 and 7 there is provided a spring pad 35 whereby the axle assembly may be resiliently connected to the frame of the vehicle for supporting the vehicle body. It is to be understood, of course, that the right-hand end of the axle assembly will be identical with the portion thereof shown, and will carry a second brake drum between the differential 23 and the adjacent web at the opposite side of the axle.

In the form of the invention shown in Figure 2 the construction has been modified to provide independently rotatable wheels on the tubular spindle with separate brakes for each of the wheels. In this form of the invention only one of the wheels at each side of the axle is driven from the power train of the vehicle.

Referring to this modification in detail, the axle assembly comprises the parallel spaced cross members 40 which are joined at their ends by the transverse member 42 which has an enlarged hub portion receiving a spindle 43 and a sleeve member 44, the sleeve member 44 being flanged at its ends as indicated at 45 and being locked with the spindle 43 against rotation relative the axle assembly.

The end of the spindle 43 is reduced as indicated at 46 to receive side-by-side wheel spiders 47 and 48 carrying pneumatic tires 49. The spiders 47 and 48 are each provided with independent bearing support upon the spindle 46 so that they may rotate independently and the outboard wheel 47 has bolted to the hub thereof the flange 48 of an axle shaft 49 which extends through the spindle 43 into the differential 23 which corresponds to the differential shown in Figure 1. Thus, it will be apparent that torque from the differential is applied only to the outboard spider 47 and that the inboard wheel serves merely as a load supporting member but does not transmit driving torque from the power train of the vehicle.

Mounted on the inner face of the inboard spider 48 is a brake drum 50 and mounted on the outer flange 45 of the sleeve 43 is a backing plate 52 carrying a brake actuating mechanism indicated generally at 53.

The inboard flange 45 of the sleeve 44 carries a corresponding backing plate 54 having brake actuating mechanism 55 disposed thereon and within the brake drum 56 keyed or otherwise splined as at 57 to the shaft 49. A suitable spring pad 58 is mounted on the cross member 42 for supporting the vehicle body on the axle.

It will be apparent that with this type of construction the braking action is imposed on each of the wheels 47 and 48 by independent brake drums associated with each wheel. Because of the fact that the brake drum 50 is radially spaced from the rim within the wheel 48 and the other brake drum 56 is, of course, disposed out in the open, where the heat can be dissipated therefrom, no adverse effects are produced by the heat generated in braking.

It is therefore believed apparent that I have provided an axle construction capable of providing ready dissipation of heat from the braking members.

I do not intend to be limited to the exact details herein shown and described, but only insofar as described by the scope and spirit of the appended claims.

I claim:

1. An axle construction comprising a pair of tubular spindles disposed in coaxial spaced relation, wheels rotatably mounted on the ends of said spindles, means interconnecting said spindles comprising a rigid rectangular frame having parallel end members receiving the inboard ends of said spindles and including parallel side members interconnecting said end members, a differential extending across said side members and supported at the center thereof, axle shafts leading from opposite sides of said differential through said spindles and bolted to said wheels for driving the same from said differential, said shafts being unenclosed between said spindles and said differential brake drum means on said shafts intermediate said differential and the inboard ends of said spindles, and brake drum engaging means supported on the inner face of said end members.

2. In combination, a rectangular axle frame having a differential supported centrally thereon, tubular spindles projecting from and supported in each end of said frame, said frame being open between said differential and said frame ends wheels journalled on the outer ends of said spindles, a drive shaft extending from said differential through each of said spindles and secured in driving engagement with said wheels, a brake drum keyed on each shaft within the open portion of said frame and adjacent said differential, and brake drum engaging means supported on said frame about the inner ends of each spindle adjacent said drum.

3. An axle comprising a rectangular frame, tubular spindles extending from opposite ends of said frame, wheels rotatably mounted on the outer ends of said spindles, a differential drive mechanism mounted on said frame intermediate the inner ends of said spindles, drive axle shafts extending from said mechanism through said spindles and secured at the outer ends thereof to said wheels, a brake drum secured to each of said shafts intermediate said mechanism and the inner end of the adjacent spindle, and brake drum engaging means supported on the associated end of said frame about the inner end of said adjacent spindle.

4. An axle comprising a rigid frame including parallel transverse members joined at their ends by end members to form an open rectangular structure, tubular spindles carried by said end members, wheels rotatably mounted on the outer ends of said spindles, a differential supported on the center of said frame having oppositely extending axle shafts projecting through said spindles and secured to said wheels, brake drums located in the open part of said frame and secured on said shafts intermediate said differential and said end members, and drum-engaging means carried by the inboard faces of said end members.

GEORGE SPATTA.